United States Patent
Kamire et al.

(10) Patent No.: US 11,883,796 B2
(45) Date of Patent: Jan. 30, 2024

(54) HIGH EFFICIENCY COMBINED HYDROCARBON AND OZONE CONVERTER

(71) Applicant: Honeywell International Inc., Charlotte, NC (US)

(72) Inventors: Rebecca Kamire, Buffalo Grove, IL (US); Nicholas Brom, Chicago, IL (US); Cassandra Buru, Buffalo Grove, IL (US); Peter M. Michalakos, Arlington Heights, IL (US); Amanda Childers, Arlington Heights, IL (US); Alexander Bershitsky, Northbrook, IL (US); Erik Efrosinis, Melrose Park, IL (US); Belinda Foor, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 161 days.

(21) Appl. No.: 17/171,896

(22) Filed: Feb. 9, 2021

(65) Prior Publication Data
US 2022/0250036 A1 Aug. 11, 2022

(51) Int. Cl.
*B01J 23/42* (2006.01)
*B01D 53/86* (2006.01)
(Continued)

(52) U.S. Cl.
CPC .......... *B01J 23/42* (2013.01); *B01D 53/864* (2013.01); *B01D 53/8675* (2013.01);
(Continued)

(58) Field of Classification Search
None
See application file for complete search history.

(56) References Cited

U.S. PATENT DOCUMENTS

| | | | |
|---|---|---|---|
| 6,616,903 | B2 | 9/2003 | Poles et al. |
| 7,037,878 | B2 | 5/2006 | Liu et al. |

(Continued)

FOREIGN PATENT DOCUMENTS

| | | |
|---|---|---|
| EP | 0404902 A1 | 1/1991 |
| EP | 2548630 A1 | 1/2013 |

(Continued)

OTHER PUBLICATIONS

Aeroxide, Aeroxide TiO2 P25, http://glenncorp.com/wp-content/uploads/2013/12/AEROXIDE-TiO2-P-25.pdf (Year: 2013).*

(Continued)

*Primary Examiner* — Coris Fung
*Assistant Examiner* — Keling Zhang
(74) *Attorney, Agent, or Firm* — Shumaker & Sieffert, P.A.

(57) ABSTRACT

In some examples, a composition includes a hydrocarbon and ozone catalyst. The hydrocarbon and ozone catalyst includes one or more catalytic layers overlying a substrate. The one or more catalytic layers include a non-catalytic component, an ozone catalytic component, and a hydrocarbon catalytic component. The non-catalytic component includes titanium oxide. The ozone catalytic component includes cobalt oxide. The hydrocarbon catalytic component includes platinum. An outermost layer of the one or more catalytic layers includes the hydrocarbon catalytic component distributed in the non-catalytic component.

17 Claims, 3 Drawing Sheets

(51) Int. Cl.
B01J 23/75 (2006.01)
B01J 35/00 (2006.01)
B01J 35/02 (2006.01)
B01J 37/00 (2006.01)
B01J 37/02 (2006.01)
B64D 13/06 (2006.01)
B82Y 30/00 (2011.01)

(52) U.S. Cl.
CPC ........... B01J 23/75 (2013.01); B01J 35/0006 (2013.01); B01J 35/023 (2013.01); B01J 37/0009 (2013.01); B01J 37/0244 (2013.01); B64D 13/06 (2013.01); B01D 2257/106 (2013.01); B01D 2257/702 (2013.01); B64D 2013/0685 (2013.01); B82Y 30/00 (2013.01)

(56) References Cited

U.S. PATENT DOCUMENTS

| | | | |
|---|---|---|---|
| 7,604,779 | B2 | 10/2009 | Liu et al. |
| 7,629,290 | B2 | 12/2009 | Michalakos et al. |
| 8,394,331 | B2 | 3/2013 | Foor et al. |
| 9,399,208 | B2 | 7/2016 | Yang et al. |
| 2003/0188850 | A1 | 10/2003 | Liu et al. |
| 2004/0175313 | A1 | 9/2004 | Foor et al. |
| 2005/0129589 | A1 | 6/2005 | Wei et al. |
| 2005/0129591 | A1 | 6/2005 | Wei et al. |
| 2006/0084571 | A1 | 4/2006 | Michalakos et al. |
| 2013/0022523 | A1 | 1/2013 | Foor et al. |
| 2016/0304789 | A1 | 10/2016 | Daly et al. |

FOREIGN PATENT DOCUMENTS

| | | |
|---|---|---|
| WO | 0907377 A1 | 7/1990 |
| WO | 2005000467 A1 | 1/2005 |
| WO | 2015055672 A1 | 4/2015 |

OTHER PUBLICATIONS

Tobaldi et al., Fully quantitative X-ray characterization of Evonik Aeroxide TiO2 P25, Materials Letters, 2014, 122, 345-347 (Year: 2014).*

Beck et al., Platinum nanoparticles on Al2O3: Correlation between the particle size and activity in total methane oxidation, Journal of Catalysis, 2009, 268, 60-67 (Year: 2009).*

Youtube., "Deoxo catalytic ozone converters by BASF," uploaded Jan. 4, 2016, retrieved from https://www.youtube.com/watch?app=desktop&v=RpsPymK-Riw, 1 pp.

Extended Search Report from counterpart European Application No. 22152561.1, dated Jun. 14, 2022, 7 pp.

Response to Extended Search Report dated Jun. 14, 2022, from counterpart European Application No. 22152561.1 filed Aug. 8, 2022, 12 pp.

* cited by examiner

HIGH EFFICIENCY COMBINED HYDROCARBON AND OZONE CONVERTER

TECHNICAL FIELD

The present disclosure relates to hydrocarbon and ozone converters.

BACKGROUND

An environmental control system (ECS) provides clean, pressurized air to a cabin of an aircraft. This pressurized air may be supplied from a variety of sources, such as bleed air from an engine or auxiliary power unit (APU) or compressed air from a cabin air compressor (CAC) or load compressor. To produce an adequate supply of pressurized air to the cabin, these pressurized air sources receive air from an environment of the aircraft and consume fuel or energy to compress the air. The pressurized air may include various contaminants from the environment, including hydrocarbons and/or ozone. Ozone ($O_3$) is an allotropic form of oxygen and is more active chemically than ordinary oxygen ($O_2$), and even at low levels of concentration, may cause irritation of the respiratory systems of passengers. Ozone may be formed photochemically from oxygen in the Earth's atmosphere, and may be present at high altitudes, such as altitudes that exceed 20,000 feet. Hydrocarbons may be present in bleed air, and may be odorous and unpleasant for passengers and crew of the aircraft. Hydrocarbons may also be ingested into the bleed air system during operation (e.g., engine oil) and from refueling operations, de-icing operations, and ground vehicle exhaust. Hydrocarbons present in bleed air may include combustion products, aviation lubricant fumes or aerosols, hydraulic fluid, engine oil, and engine exhaust.

SUMMARY

One or more high temperature components of an air purification system, such as an ECS of an aircraft, may include a hydrocarbon and ozone catalyst configured to reduce hydrocarbons and/or ozone in pressurized air with a high hydrocarbon or ozone conversion efficiency. The hydrocarbon and ozone catalyst may include one or more catalytic layers that include cobalt oxide as an ozone catalytic component, platinum as a hydrocarbon catalytic component, and titanium oxide as a non-catalytic component supporting at least the hydrocarbon catalytic component. The titanium oxide of the non-catalytic component may increase catalytic activity of the platinum of the hydrocarbon catalytic component, such that the platinum may provide a higher amount of hydrocarbon removal at an equivalent loading and/or an equivalent amount of hydrocarbon removal at lower loading. The one or more catalytic layers may be applied to surfaces of a high temperature component at relatively low temperatures (e.g., temperatures at or below operating temperatures of the component), such that the hydrocarbon and ozone catalyst may be applied as a new coating to a bare substrate surface or a recoat to an existing coated substrate.

In some examples, the disclosure describes a composition that includes a hydrocarbon and ozone catalyst. The hydrocarbon and ozone catalyst includes one or more catalytic layers overlying a substrate. The one or more catalytic layers include a non-catalytic component, an ozone catalytic component, and a hydrocarbon catalytic component. The non-catalytic component includes titanium oxide. The ozone catalytic component includes cobalt oxide. The hydrocarbon catalytic component includes platinum. An outermost layer of the one or more catalytic layers includes the hydrocarbon catalytic component distributed in the non-catalytic component.

In some examples, the disclosure describes an apparatus that includes a substrate and one or more catalytic layers overlying the substrate. The one or more catalytic layers include a non-catalytic component, an ozone catalytic component, and a hydrocarbon catalytic component. The non-catalytic component includes titanium oxide. The ozone catalytic component includes cobalt oxide. The hydrocarbon catalytic component includes platinum. An outermost layer of the one or more catalytic layers includes the hydrocarbon catalytic component distributed in the non-catalytic component.

In some examples, the disclosure describes a method of removing contaminants from pressurized air for an environmental control system (ECS). The method includes receiving, by a component of the ECS, the pressurized air from a pressurized air source. The pressurized air includes hydrocarbons or ozone. The component includes a hydrocarbon and ozone catalyst including one or more catalytic layers overlying one or more surfaces of the component. The one or more catalytic layers include a non-catalytic component that includes titanium oxide, an ozone catalytic component that includes cobalt oxide, and a hydrocarbon catalytic component that includes platinum. An outermost layer of the one or more catalytic layers includes the hydrocarbon catalytic component distributed in the non-catalytic component. The method further includes converting, by the hydrocarbon and ozone catalyst, at least a portion of the ozone to oxygen and at least a portion of the hydrocarbons to carbon dioxide and water.

In some examples, the disclosure describes a method of forming a hydrocarbon and ozone catalyst on a substrate. The hydrocarbon and ozone catalyst includes one or more catalytic layers. These catalytic layers include a non-catalytic component of titanium oxide, an ozone catalytic component of cobalt oxide, and a hydrocarbon catalytic component of platinum. An outermost layer of the one or more catalytic layers includes the hydrocarbon catalytic component distributed in the non-catalytic component.

The details of one or more examples are set forth in the accompanying drawings and the description below. Other features, objects, and advantages will be apparent from the description and drawings, and from the claims.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

An ECS of an aircraft may include a combined hydrocarbon and ozone converter (CHOC) to convert ozone into oxygen and hydrocarbons into carbon dioxide and water. By combining both hydrocarbon and ozone conversion into a single unit, a CHOC may have a reduced weight and operate with a reduced pressure drop compared to separate hydrocarbon and ozone converters. To further improve odor removal by the combined converter, the combined converter may include an increased amount of hydrocarbon catalyst. However, the hydrocarbon catalyst may include precious metals such as platinum, such that increasing the amount of the hydrocarbon catalyst to improve performance may be expensive or may not be possible to achieve a desired activity. Additionally or alternatively, a maintenance life of a combined hydrocarbon and ozone converter may be limited by an ozone catalyst of the combined converter, which may be subject to decomposition over time. To replace an active catalyst portion of the combined converter, the entire converter may be replaced at high expense.

According to various embodiments described herein, one or more high temperature components (e.g., configured to operate above 120 degrees Celsius (° C.)) of an ECS of an aircraft may include a combined hydrocarbon and ozone catalyst configured to reduce hydrocarbons and/or ozone in pressurized air at relatively low operating temperatures and/or at relatively high conversion efficiency at relatively high temperatures, such that an amount of a hydrocarbon catalyst may be relatively small and/or a lifetime of an ozone catalyst may be relatively long. For example, the combined hydrocarbon and ozone catalyst may remove hydrocarbons at grounded conditions and ozone at high elevation conditions. The combined hydrocarbon and ozone catalyst may be present as one or more catalytic layers on various surfaces of the high temperature components, including specific use hydrocarbon and ozone specific components (e.g., a CHOC) and/or general use heat transfer components that receive the pressurized air (e.g., a subcooler or primary heat exchanger).

Figure 1:
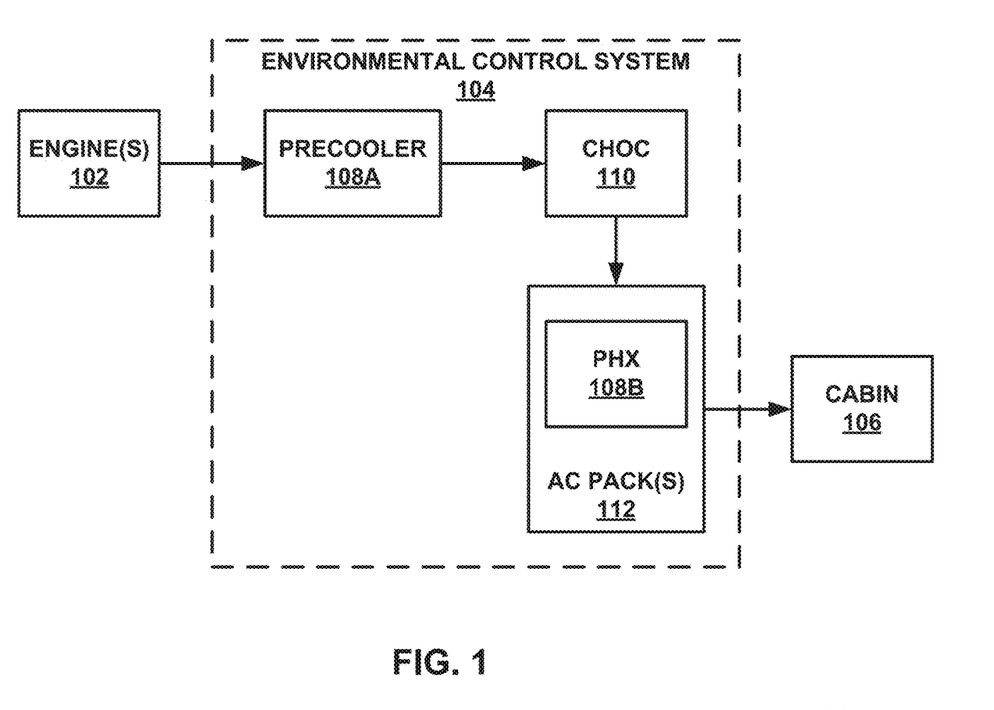
FIG. 1 is a conceptual schematic diagram of an environmental control system (ECS) of an aircraft.

FIG. 1 is a conceptual schematic diagram of an aircraft system 100 that includes hydrocarbon and ozone catalysts as described herein for providing clean, pressurized air to a controlled environment. System 100 includes one or more engines 102 configured to generate bleed air in one or more compressor sections for use as pressurized air in an environmental control system (ECS) 104 of an aircraft. While FIG. 1 illustrates engine 102 as a pressurized air source and bleed air as the pressurized air, in other examples, other pressurized air sources may be used to generate pressurized air, such as a cabin air compressor, a load compressor, an auxiliary power unit (APU), and the like. For example, during flight, ECS 104 may receive bleed air from one or more engines 102, while during grounding, ECS 104 may receive bleed air from an APU (not shown). The bleed air may have a flow between about 1 and about 250 pounds (lbs) air flow/minute (min), a pressure between about 10 and about 50 pounds per square inch (psia), and/or space velocities between about 15,000 and about 1,000,000 per hour (hr). As will be explained below, depending on a source of the pressurized air and/or flight or grounding conditions of the aircraft, a composition of the pressurized air may vary.

Environmental control system 104 is configured to cool the bleed air from engines 102 to produce clean, pressurized air for a controlled environment, such as a cabin 106 of an aircraft or other air-limited environment. While FIG. 1 illustrates cabin 106 of an aircraft as a controlled environment, in other examples, ECS 104 may provide clean air for other controlled environments, such as a cabin of a submarine, a cabin of a space craft, and the like. The bleed air from engines 102 may be relatively hot and require cooling prior to distribution into cabin 106. For example, bleed air after expansion may have a temperature between about 200° to about 500° C.

ECS 104 may be configured to cool the bleed air using one or more heat exchangers (HEX), such as precooler 108A and/or primary heat exchanger (PHX) 108B (collectively referred to as "HEX 108") and one or more air conditioning (AC) packs 112. HEX 108 and AC packs 112 may be configured to cool the bleed air using ram air directly from a ram air intake system (e.g., using a ram-air-cooled heat exchanger) and/or indirectly from a vapor or air cycle system cooled by ram air from a ram air intake system (e.g., using an evaporator and a ram-air-cooled condenser). For example, precooler 108A may provide a first stage of cooling of the bleed air to a temperature in the range of about 100° C. to about 250° C., while PHX 108B may provide a second stage of cooling of the bleed air to a temperature in the range of about 10° C. to about 30° C.

The bleed air from engines 102 may include one or more contaminants, including hydrocarbons or ozone from environmental air taken in by engines 102. A composition of the bleed air may depend on flight or grounding conditions of the aircraft, as a composition of the environmental air may vary based on an altitude of the aircraft or a proximity of the aircraft to other aircraft or maintenance equipment. As one example, during high altitude flight conditions, a proportion of ozone in atmospheric air received by engines 102 may be relatively high compared to grounded or low altitude flight conditions. As another example, during grounded conditions, a proportion of hydrocarbons received from exhaust from other aircraft may be relatively high compared to flight conditions.

To remove these contaminants, one or more high temperature components of ECS 104 may include a combined hydrocarbon and ozone catalyst. A high temperature component of ECS 104 may include a component having an operating temperature greater than about 120° C. As one example, to catalytically decompose hydrocarbons in bleed air into carbon dioxide and water, the hydrocarbon and ozone catalyst may operate at a reaction temperature above about 120° C. As another example, the hydrocarbon and ozone catalyst may exhibit improved ozone removal at higher temperatures of air entering the high temperature component, such as operating temperatures up to 250° C. during flight or 200° C. on the ground. In addition to having relatively high operating temperatures, the one or more high temperature components may have relatively high surface areas to provide sufficient contact with air passing through the high temperature components. In the example of FIG. 1, precooler 108A, PHX 108B, and CHOC 110 are illustrated as high temperature components; however, in other examples, only one or two of precooler 108A, PHX 108B, CHOC 110 may be included in ECS 104. Additionally, other high temperature (and optionally, high surface area) components may include the combined hydrocarbon and ozone catalyst described herein.

The hydrocarbon and ozone catalyst includes one or more catalytic layers overlying a substrate, such as a coating, anodized surface layer, wall, or other supporting structure of a component of ECS 104. The one or more catalytic layers include an ozone catalytic component configured to decompose ozone in the bleed air, a hydrocarbon catalytic component configured to decompose hydrocarbons in the bleed air, and a non-catalytic component configured to provide a high surface area to the one or more catalytic layers and/or improve catalytic activity of at least the hydrocarbon catalytic component. Each of the ozone catalytic component, hydrocarbon catalytic component, and non-catalytic component may include particles, phases, or other differentiated portions in the one or more catalytic layers.

In some examples, the combined hydrocarbon and ozone catalyst may be present as part of a contaminant removal component, such as a catalytic converter. For example, as illustrated in FIG. 1, system 100 may include a combined hydrocarbon and ozone converter (CHOC) 110. CHOC 110 may be configured to receive pressurized air from precooler 108A and discharge cooler pressurized air to AC packs 112, such as PHX 108B; however, in some examples, only one HEX 108 may be included. CHOC 110 may include surfaces configured to support the one or more catalytic layers, such that the bleed air contacts the one or more catalytic layers. For example, CHOC 110 may have a relatively high surface area. CHOC 110 may be configured to operate at temperatures sufficiently high to convert at least a portion of the ozone and/or hydrocarbons in the bleed air. CHOC 110 may be relatively independent of other operating conditions compared to components that provide other functions, such that CHOC 110 may efficiently convert ozone and/or hydrocarbons in the bleed air. For example, CHOC 110 may include a relatively high surface area core that provides high mass transfer, such that contaminants in the air make good contact with the one or more catalytic layers of the combined hydrocarbon and ozone catalyst. CHOC 110 may be configured for specific operating conditions experienced by system 100. For example, CHOC 110 may include a core having a particular length, multiple cores connected in series or parallel, and/or a core having a specific structural configuration (e.g., offset fin core) for increasing mass transfer with the air. In some examples, such as examples in which a catalytic performance of CHOC 110 deteriorates over a period of time, CHOC 110 may be recoated with the one or more catalytic layers to regenerate catalytic performance. For example, after a period of performance, cleaning surfaces of CHOC 110 may be insufficient to return CHOC 110 to a desired performance. Replacement of one or more cores of CHOC 110 may improve performance, but may be relatively expensive. Rather than replace one or more cores of CHOC 110, the one or more catalytic layers may be capable of being applied to one or more cores of CHOC 110 as a recoat to improve performance of CHOC 110.

In some examples, the combined hydrocarbon and ozone catalyst may be present as part of a component in which contaminant removal is a secondary function, such as a heat exchanger or precooler. For example, as illustrated in FIG. 1, system 100 may include precooler 108A and PHX 108B. Precooler 108A may be configured to provide a first stage of cooling of the bleed air prior to entering AC packs 112 and PHX 108B may be configured to provide a second stage of cooling of the bleed air prior to being discharged into cabin 106 or other components of AC packs 112. Each HEX 108 may include surfaces, such as within tubes of HEX 108, that include the one or more catalytic layers. At least a portion of each HEX 108, such as a portion near an inlet of the bleed air, may be configured to operate at temperatures sufficiently high to convert at least a portion of the ozone and/or hydrocarbons in the bleed air. Each HEX 108 may convert ozone and/or hydrocarbons in the bleed air with a lower pressure drop and lower weight than a separate heat exchanger and catalytic converter, such that the bleed air may be received at a relatively low pressure and contribute to a lower overall weight of the aircraft. In this way, each HEX 108 may combine the functionality of heat transfer and contaminant removal in a single unit that reduces the weight, volume and pressure drop for ECS 104. Precooler 108A may receive air at relatively higher temperatures compared to air received by CHOC 110, which may cause a higher rate of decomposition of hydrocarbons and/or ozone.

In some examples, the one or more catalytic layers may be applied as a coating to one or more components of ECS 104. As one example, various surfaces of HEX 108 exposed to the bleed air may be coated with the one or more catalytic layers, such that off-the-shelf components may be functionalized for contaminant removal. As another example, various surfaces of CHOC 110 may be re-coated with the one or more catalytic layers, such that performance of CHOC 110 may be improved without replacing an entire component.

High temperature components of ECS 104 that include the hydrocarbon and ozone catalyst described herein may be configured to individually or simultaneously decompose hydrocarbons and/or ozone in pressurized air for use in cabin 106. In operation, bleed air from engines 102 may flow through each HEX 108 and/or CHOC 110 and contact the one or more catalytic layers of the hydrocarbon and ozone catalyst, including the hydrocarbon and ozone catalytic components. The hydrocarbon catalytic component may decompose at least a portion of the hydrocarbons to carbon dioxide and water, such as when the aircraft is grounded or in flight, while the ozone catalytic component may decompose at least a portion of the ozone to oxygen gas, such as when the aircraft is at a high altitude. By combining both hydrocarbon and ozone removal functions in a single unit, ECS 104 may efficiently remove hydrocarbons and/or ozone while maintaining lower weight and/or producing lower pressure drop than separate hydrocarbon and ozone catalytic systems, thereby reducing fuel consumption. The one or more catalytic layers of the hydrocarbon and ozone catalyst may be easily integrated with existing components of ECS 104, including components having other heat exchange functions or components already coated with catalytic or support layers.

Figure 2A:
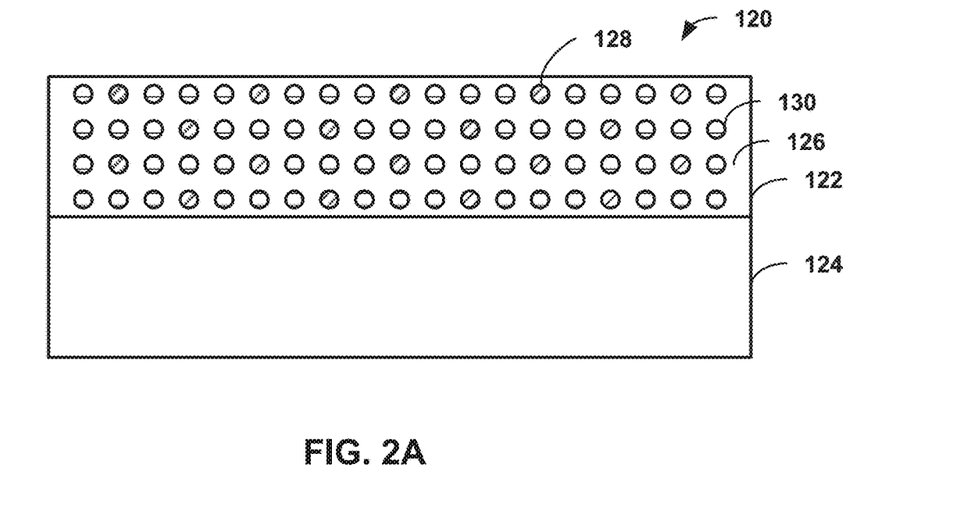
FIG. 2A is a side view cross-section diagram of an example apparatus for converting hydrocarbons and ozone that includes a single layer and a bare substrate.

FIGS. 2A-2D illustrate various configurations of a hydrocarbon and ozone catalyst on a substrate of a component of an environmental control system, such as ECS 104 of FIG. 1. FIG. 2A is a side view cross-section diagram of an example apparatus for converting hydrocarbons and ozone that includes a single catalytic layer 122 overlying a bare substrate 124. Hydrocarbon and ozone catalytic layer 122 includes a non-catalytic component 126, a hydrocarbon catalytic component 128, and an ozone catalytic component 130. Hydrocarbon catalytic component 128 and ozone catalytic component 130 may be present as particles or phases dispersed in relatively high surface area binders. In the example of FIG. 2A, the one or more catalytic layers include a single hydrocarbon and ozone catalytic layer 122 that includes a non-catalytic component 126 as a binder.

Substrate 124 may include any portion of a component, such as a wall, coating, or surface layer, capable of supporting one or more catalytic layers, such as catalytic layer 122. Substrate 124 may include a component of an environmental control system, an auxiliary power unit bleed duct, a precooler, and the like. A variety of substrates may be used for substrate 124 including, but not limited to, a ceramic, aluminum, steel, nickel alloy, or any other relatively high temperature material used in components of ECS 104 in contact with bleed air. In some examples, substrate 124 may be configured to have sufficient mass transfer between a gas phase (e.g., bleed air) and catalyst-coated surface without causing substantial increase of pressure drop. For example, substrate 124 may include one or more physical structures configured to support hydrocarbon and ozone catalyst 122, such as fins, baffles, or other two- or three-dimensional structures.

In addition or alternative to a high surface area substrate 124, hydrocarbon and ozone catalytic layer 122 may have a high surface area to improve contact between contaminants in the bleed air and hydrocarbon catalytic component 128 and ozone catalytic component 130. In some examples, hydrocarbon and ozone catalytic layer 122 may be porous, such that pressurized air may infiltrate hydrocarbon and ozone catalytic layer 122 and interact with hydrocarbon catalytic component 128 and ozone catalytic component 130 on surfaces in hydrocarbon and ozone catalytic layer 122. For example, hydrocarbon and ozone catalytic layer 122 may be a washcoat or other layer having a relatively high surface area. In some examples, hydrocarbon and ozone catalytic layer 122 may have a surface area greater than about 20 $m^2$/g (surface area of layer 122 in square meters per weight of layer 122 in grams).

In the example of FIG. 2A, ozone catalytic component 130 is dispersed within non-catalytic component 126 of hydrocarbon and ozone catalytic layer 122. Ozone catalytic component 130 is configured to decompose ozone in the bleed air into oxygen. Ozone catalytic component 130 may include a p-type oxide, such as cobalt oxide ($Co_3O_4$), having a high catalytic activity for ozone decomposition. Cobalt oxide may be configured to decompose ozone ($O_3$) into oxygen gas ($O_2$), and may have a high surface area for contacting the bleed air. In some instances, cobalt oxide may act as a promoter for hydrocarbon catalytic component 128 and may increase the catalytic activity of hydrocarbon catalytic component 128. In addition to cobalt oxide, ozone catalytic component 130 may include one or more other ozone catalytic materials, such as manganese oxide, nickel oxide, platinum, and/or palladium.

Hydrocarbon catalytic component 128 is dispersed within hydrocarbon and ozone catalytic layer 122. Hydrocarbon catalytic component 128 is configured to convert hydrocarbons in the bleed air into carbon dioxide and water. Hydrocarbon catalytic component 128 includes platinum. Platinum may be configured to decompose hydrocarbons, such as hydrocarbons found in lubricants or exhaust, into carbon dioxide and water. In some examples, hydrocarbon catalytic component 128 includes more than one type of platinum. For example, without being limited to any particular theory, metallic platinum may have a higher catalytic activity than non-metallic platinum. However, metallic platinum may be relatively expensive or difficult to prepare from an oxidized non-metallic platinum feedstock (e.g., having an oxidation state of +2 or +4), especially at high levels of purity. Hydrocarbon catalytic component 128 may include a mixture of metallic and non-metallic platinum while still maintaining high catalytic activity, thereby reducing a cost of fabricating hydrocarbon catalytic component 128. In some examples, hydrocarbon catalytic component 128 may include a first portion that includes metallic platinum and a second portion that includes non-metallic, oxidized platinum having an oxidation state of +2 or +4. The first portion may include metallic platinum at a concentration greater than about 50 weight percentage (wt. %) and less than 100 wt. %, while the second portion may include non-metallic platinum at a concentration less than about 50 wt. %.

Non-catalytic component 126 may include titanium oxide as a refractory component for supporting hydrocarbon catalytic component 128, and optionally (such as illustrated in FIG. 2A), ozone catalytic component 130. Non-catalytic component 126 may act as a binder for adhering/cohering components, such as catalytic component 128 and/or ozone catalytic component 130, in the one or more catalytic layers. In some examples, non-catalytic component 126 may include other non-catalytic components in addition or instead of titanium oxide, such as aluminum oxide, silicon oxide, or another metal oxide such as cerium oxide. In some examples, hydrocarbon and ozone catalytic layer 122 may not substantially include silicone resin as a binder, while in other examples, hydrocarbon and ozone catalytic layer 122 may include silicone resin as a binder, along with non-catalytic component 126.

Hydrocarbon catalytic component 128, ozone catalytic component 130, and non-catalytic component 126 may be present in the one or more catalytic layers as relatively small particles configured to have a relatively high surface area to volume ratio. For example, hydrocarbon catalytic component 128, ozone catalytic component 130, and non-catalytic component 126 may be formed from relatively small particles and adhered together during preparation of the one or more catalytic layers. A catalytic activity of the hydrocarbon and ozone catalyst may be related to a surface area of the catalyst for contact with the pressurized air, such that relatively little void space within the one or more catalytic layers may result in a lower catalytic activity due to less contact with air. Non-catalytic component 126 may include non-catalytic particles having an average particle size (e.g., largest dimension, diameter, length, etc.) less than about 50 nanometers, such as between about 15 nanometers and about 30 nanometers. Ozone catalytic component 130 may include ozone catalytic particles having an average particle size less than about 50 micrometers, such as less than about 15 micrometers. Hydrocarbon catalytic component 128 may include hydrocarbon catalytic particles having an average particle size less than about 30 nanometers, such as less than about 15 nanometers.

Non-catalytic component 126, hydrocarbon catalytic component 128, and ozone catalytic component 130 may be present in catalytic layer 122 in a variety of concentrations. A composition of hydrocarbon catalytic component 128 and ozone catalytic component 130 may vary based on an anticipated composition of the pressurized air (e.g., an initial concentration of hydrocarbons and/or ozone), a target composition of clean, pressurized air (e.g., a final concentration of hydrocarbons and/or ozone discharged to cabin 106), a projected life of a component on which catalytic layer 122 is deposited, and the like. For example, catalytic layer 122 may include a concentration of hydrocarbon catalytic component 128 that provides a desired level of hydrocarbon removal at a relatively low cost, a concentration of ozone catalytic component 130 that provides a desired level of ozone removal through an end of life of catalytic layer 122, and/or a concentration of non-catalytic component 126 that provides relatively strong adhesion of components within catalytic layer 122 and provides sufficient distribution of hydrocarbon catalytic component 128 throughout catalytic layer 122 to provide a desired level of hydrocarbon removal. In some examples, a weight ratio of ozone catalytic component 130 to non-catalytic component 126 is between about 1:0.6 to about 1:2. In some examples, a weight ratio of hydrocarbon catalytic component 128 to ozone catalytic component 130 is between about 1:5 to about 1:100. Ozone catalytic component 130 may be contaminated relatively quickly compared to hydrocarbon catalytic component 128, such that a weight ratio of ozone catalytic component 130 may be relatively high compared to hydrocarbon catalytic component 128, thereby increasing contamination resistance of ozone conversion of hydrocarbon and ozone catalytic layer 122. For example, as active ozone catalytic sites of ozone catalytic component 130 become blocked by contaminants, such as sulfur or phosphorous, additional ozone catalytic sites may remain to sustain ozone decomposition, resulting in a longer-lasting component.

Figure 2B:
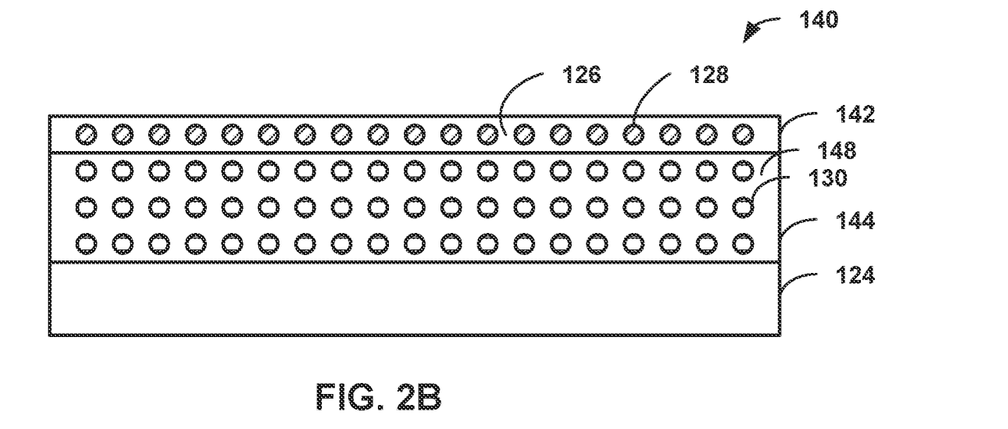
FIG. 2B is a side view cross-section diagram of an example apparatus for converting hydrocarbons and ozone that includes two layers and a bare substrate.

FIG. 2B is a side view cross-section diagram of an example apparatus 140 for converting hydrocarbons and ozone that includes two layers 142, 144 and a substrate 124. In the example of FIG. 2B, the one or more catalytic layers include a hydrocarbon catalytic layer 142 and an ozone catalytic layer 144. An outermost layer of the one or more catalytic layers includes hydrocarbon catalytic component 128 distributed in non-catalytic component 126.

Hydrocarbon catalytic layer 142 includes hydrocarbon catalytic component 128 distributed in non-catalytic component 126. Ozone catalytic layer 144 includes ozone catalytic component 130 in a binder 148. In some examples, ozone catalytic layer 144 includes a silicone resin, aluminum oxide, titanium oxide, or silicon oxide as binder 148. In some examples, ozone catalytic layer 144 does not substantially include titanium oxide, such that a cost of the hydrocarbon and ozone catalyst may be reduced.

Figure 2C:
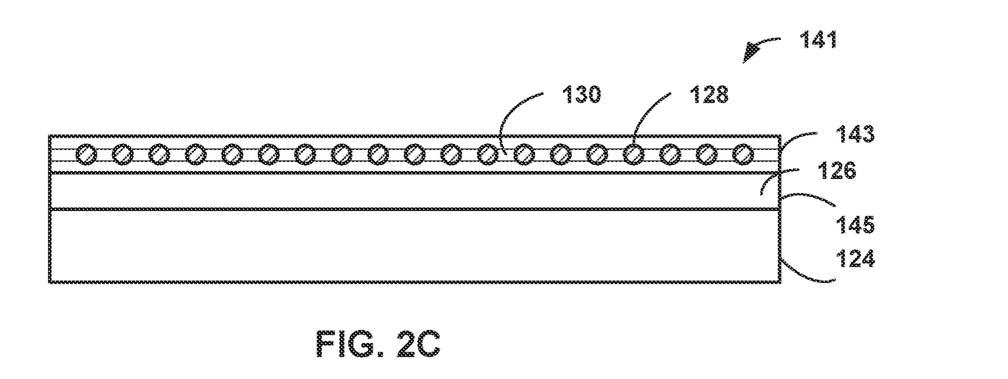
FIG. 2C is a side view cross-section diagram of an example apparatus for converting hydrocarbons and ozone that includes two layers and a bare substrate.

While FIG. 2B has been described as having hydrocarbon catalytic component 128 distributed in non-catalytic component 126, in some examples, hydrocarbon catalytic component 128 may be associated with ozone catalytic component 130. FIG. 2C is a side view cross-section diagram of an example apparatus 141 for converting hydrocarbons and ozone that includes two layers 143, 145 and a substrate 124. In the example of FIG. 2C, the one or more catalytic layers include a hydrocarbon and ozone catalytic layer 143 and non-catalytic layer 145. An outermost layer of the one or more catalytic layers includes hydrocarbon catalytic component 128 distributed in ozone catalytic component 126.

Figure 2D:
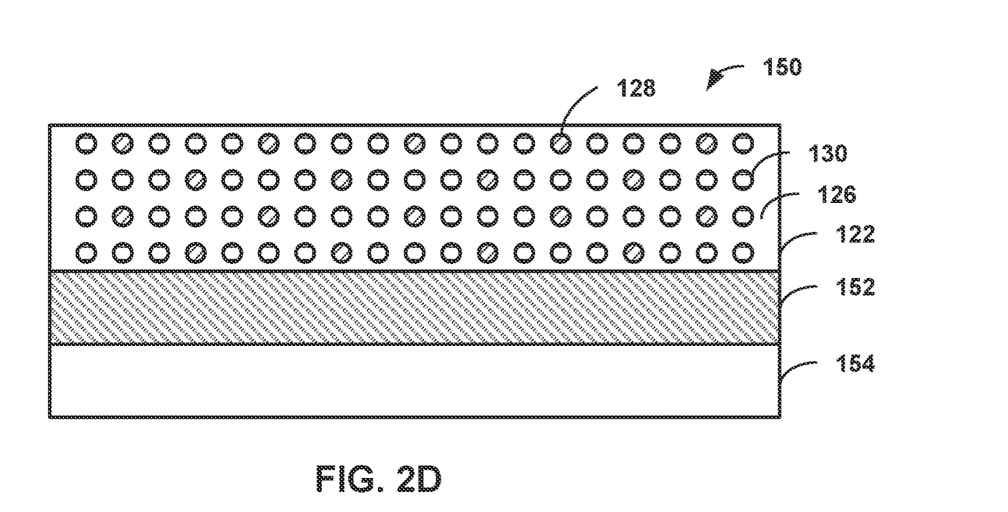
FIG. 2D is a side view cross-section diagram of an example apparatus for converting hydrocarbons and ozone that includes a coated substrate.

In addition to forming a hydrocarbon and ozone catalyst on a bare substrate, in some example, the hydrocarbon and ozone catalyst may be formed on existing layers or coatings already formed on a surface of a substrate. FIG. 2D is a side view cross-section diagram of an example apparatus 150 for converting hydrocarbons and ozone that includes a coated substrate. In the example of FIG. 2D, the substrate includes a core 154 and a surface layer 152, such that hydrocarbon and ozone catalytic layer 122 is overlying surface layer 152.

In some examples, surface layer 152 may include an anodized surface layer formed from a portion of core 154. For example, a surface of core 154 may be anodized to roughen the surface of core 154 and increase a surface area of core 154. Anodizing is an electrolytic oxidation process to create a porous layer that may be used as a support for catalytic layer 122. The anodized surface layer 152 may provide a support for hydrocarbon and ozone catalytic layer 122, such as by providing a rough surface having a high surface area. In instances in which the anodized surface layer is an integral part of the core 154, the anodized surface layer 152 may improve a binding strength between the core 154 and hydrocarbon and ozone catalytic layer 122 (or other catalytic layers, such as catalytic layers 142 and 144 of FIG. 2B).

In some examples, surface layer 152 may include another catalytic layer. As one example, surface layer 152 may include an older catalytic layer providing similar functionality as hydrocarbon and ozone catalytic layer 122, such as at least one of an ozone catalyst or a hydrocarbon catalyst. Hydrocarbon and ozone catalytic layer 122 may provide improved performance to surface layer 152.

A variety of methods may be used to form high temperature components configured to remove contaminants, as described herein. For example, a method may include forming a hydrocarbon and ozone catalyst on a substrate. The hydrocarbon and ozone catalyst includes one or more catalytic layers that, together, include a non-catalytic component that includes titanium oxide, an ozone catalytic component that includes cobalt oxide, a hydrocarbon catalytic component that includes platinum, such as shown in FIGS. 2A-2D.

In some examples, the one or more catalytic layers may be formed in a single application. For example, as illustrated in FIG. 2A, the hydrocarbon and ozone catalyst may be formed as a single hydrocarbon and ozone catalytic layer 122, such as from a single slurry or washcoat. In some examples, the one or more catalytic layers may be formed in multiple applications. For example, as illustrated in FIG. 2B, the hydrocarbon and ozone catalyst may be formed as an ozone catalytic layer 144 on substrate 124 and hydrocarbon catalytic layer 142 on ozone catalytic layer 144. In some examples, the one or more catalytic layers may be formed on other layers. For example, as illustrated in FIG. 2D, the hydrocarbon and ozone catalytic layer may be formed on surface layer 152, such as a previously coated surface layer or previously anodized surface layer.

Figure 3:
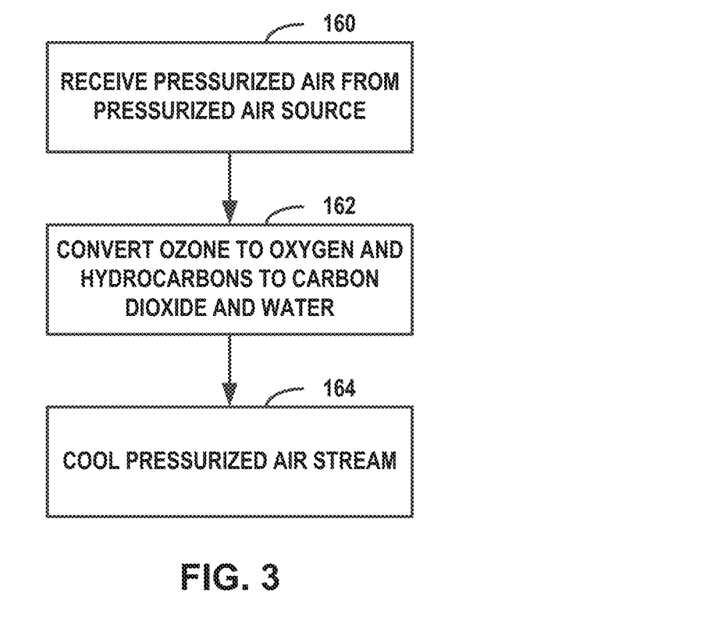
FIG. 3 is a flowchart of an example method of removing contaminants from a pressurized air stream.

FIG. 3 is a flowchart of an example method of removing contaminants from a pressurized air stream. FIG. 3 will be described with respect to system 100 of FIG. 1; however, other systems may be used with the method of FIG. 3. The method of FIG. 3 includes receiving, by a component of ECS 104, the pressurized air from a pressurized air source. In some examples, the pressurized air includes bleed air from engines 102 and/or an APU. The pressurized air includes hydrocarbons and/or ozone. In the example of FIG. 1, the component of ECS 104 may include CHOC 110 and/or HEX 108. The component of ECS 104 includes a hydrocarbon and ozone catalyst that includes one or more catalytic layers overlying one or more surfaces of the component. As shown in FIGS. 2A-2D, the one or more catalytic layers include non-catalytic component 126 including titanium oxide, ozone catalytic component 130 including cobalt oxide, hydrocarbon catalytic component 128 including platinum. An outermost layer of the one or more catalytic layers, such as hydrocarbon and ozone catalytic layer 122 or hydrocarbon catalytic layer 142, includes hydrocarbon catalytic component 128 distributed in non-catalytic component 126.

The method of FIG. 3 includes converting, by the hydrocarbon and ozone catalyst, at least a portion of the ozone to oxygen and at least a portion of the hydrocarbons to carbon dioxide and water. For example, a controller may control various parameters of components of ECS 104, such as a flow rate of bleed air through HEX 108 and/or CHOC 110, a temperature of HEX 108, a pressure of bleed air, and the like, to discharge pressurized air having a target concentration or concentration range of hydrocarbons and/or ozone in the pressurized air. As a result, a concentration of ozone and/or hydrocarbons in pressurized air discharged from HEX 108 and/or CHOC 110 may be lower than a concentration of ozone and/or hydrocarbons in pressurized air received by HEX 108 and/or CHOC 110. In some examples, a concentration of ozone discharged by ECS 104 is less than about 10% of a concentration of ozone received by ECS 104.

In some examples, the method of FIG. 3 may include cooling, by one or more heat transfer components, the pressurized air for use in cabin 106. For example, HEX 108 may provide a first stage of cooling while AC packs 112 may provide a second stage of cooling. In this way, ECS 104 may maintain concentration of hydrocarbons and/or ozone in cabin 106 below setpoints, such as setpoints configured for corresponding laws or passenger comfort.

EXAMPLES

Figure 4:
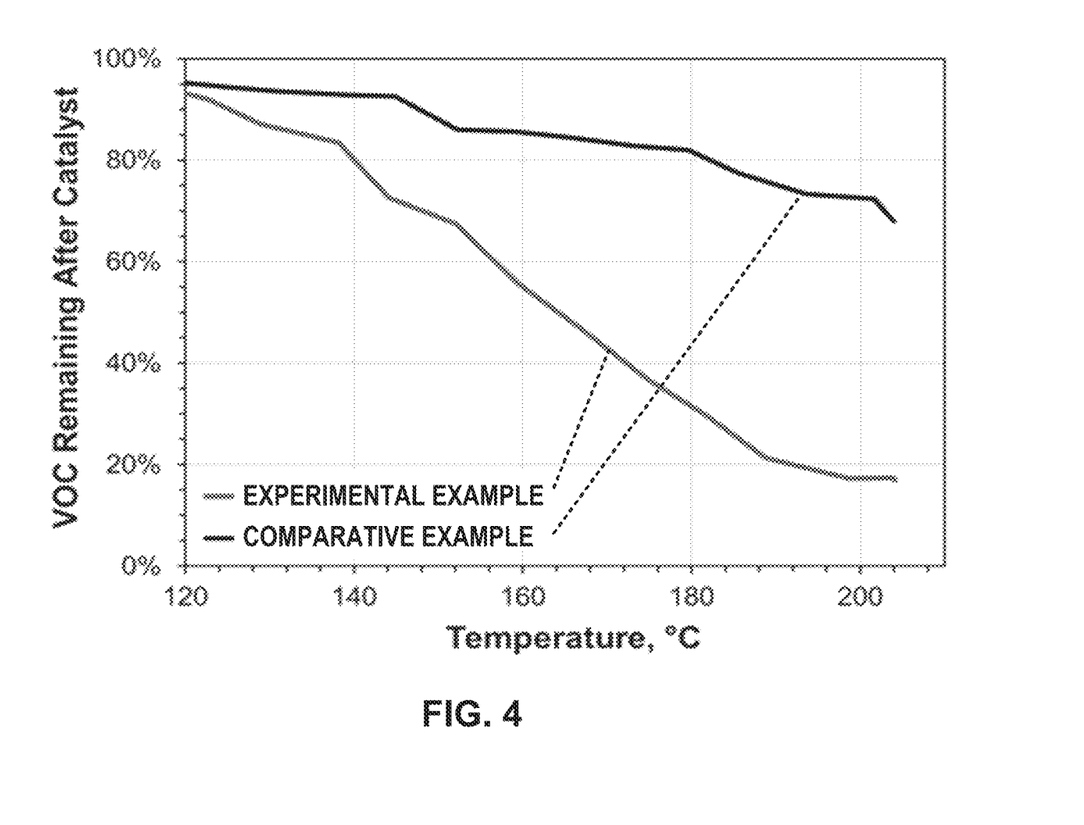
FIG. 4 is a graph of volatile organic compound (VOC) removal of two example combined hydrocarbon and ozone catalysts.

To demonstrate higher activity of the hydrocarbon and ozone catalyst described herein, removal of volatile organic compounds (VOC) was performed on an experimental example that includes the hydrocarbon and ozone catalyst and a comparative example that does not include the hydrocarbon and ozone catalyst. The experimental example is a hydrocarbon and ozone catalyst formed from a washcoat that includes titanium oxide particles, cobalt oxide particles, and platinum particles. The comparative example is a hydrocarbon and ozone catalyst formed from a washcoat that includes aluminum oxide particles, cobalt oxide particles, and platinum particles. The hydrocarbon and ozone catalysts of the experimental and comparative examples were exposed to acetonitrile and toluene as VOCs at temperatures between about 120° C. and about 210° C. FIG. 4 is a graph of VOC removal for the experimental and comparative examples. As shown in FIG. 4, the experimental example removed a greater amount of the VOCs across temperatures from 120° C. to 210° C. and that increased with increasing temperature, and exhibited particularly high conversion relative to the comparative example at temperatures above about 150° C.

Example 1: A composition includes a hydrocarbon and ozone catalyst comprising one or more catalytic layers overlying a substrate, wherein the one or more catalytic layers comprise: a non-catalytic component comprising titanium oxide; an ozone catalytic component comprising cobalt oxide; and a hydrocarbon catalytic component comprising platinum, wherein an outermost layer of the one or more catalytic layers includes the hydrocarbon catalytic component distributed in the non-catalytic component.

Example 2: The composition of example 1, wherein the hydrocarbon catalytic component comprises: a first portion that comprises metallic platinum at a concentration from about 50 weight percentage (wt. %) to 100 wt. %; and a second portion that comprises non-metallic platinum at a concentration less than about 50 wt. %, and wherein the non-metallic platinum has an oxidation state of +2 or +4.

Example 3: The composition of any of examples 1 and 2, wherein the non-catalytic component comprises non-catalytic particles having an average particle size less than about 30 nanometers.

Example 4: The composition of any of examples 1 through 3, wherein the ozone catalytic component comprises ozone catalytic particles having an average particle size less than about 50 micrometers.

Example 5: The composition of any of examples 1 through 4, wherein the hydrocarbon catalytic component comprises hydrocarbon catalytic particles having an average particle size less than about 50 nanometers.

Example 6: The composition of any of examples 1 through 5, wherein a weight ratio of the ozone catalytic component to the non-catalytic component is from about 1:0.6 to about 1:2.

Example 7: The composition of any of examples 1 through 6, wherein a weight ratio of the hydrocarbon catalytic component to the ozone catalytic component is from about 1:5 to about 1:100.

Example 8: The composition of any of examples 1 through 7, wherein the one or more catalytic layers comprise: a hydrocarbon catalytic layer includes the non-catalytic component as a binder; and the hydrocarbon catalytic component distributed in the non-catalytic component; and an ozone catalytic layer comprising the ozone catalytic component.

Example 9: The composition of example 8, wherein the ozone catalytic layer further comprises a silicone resin as a binder.

Example 10: The composition of any of examples 8 and 9, wherein the ozone catalytic layer does not substantially include titanium oxide.

Example 11: The composition of any of examples 1 through 10, wherein the one or more catalytic layers comprise a hydrocarbon and ozone catalytic layer includes the non-catalytic component as a binder; and the hydrocarbon catalytic component and the ozone catalytic component distributed in the non-catalytic component.

Example 12: The composition of example 11, wherein the one or more catalytic layers do not substantially include silicone resin as a binder.

Example 13: An apparatus includes a substrate; and one or more catalytic layers overlying the substrate, wherein the one or more catalytic layers comprise: a non-catalytic component comprising titanium oxide; an ozone catalytic component comprising cobalt oxide; and a hydrocarbon catalytic component comprising platinum, wherein an outermost layer of the one or more catalytic layers includes the hydrocarbon catalytic component distributed in the non-catalytic component.

Example 14: The apparatus of example 13, wherein the substrate comprises at least one of a ceramic, aluminum, steel, or nickel alloy.

Example 15: The apparatus of any of examples 13 and 14, wherein the substrate comprises a surface layer, and wherein the one or more catalytic layers are overlying the surface layer.

Example 16: The apparatus of example 15, wherein the surface layer comprises at least one of an ozone catalyst or a hydrocarbon catalyst.

Example 17: The apparatus of any of examples 13 through 16, wherein the substrate comprises a component of an environmental control system.

Example 18: The apparatus of example 17, wherein the component comprises at least one of a catalytic converter, an ozone converter, or a heat exchanger.

Example 19: A method of removing contaminants from pressurized air for an environmental control system (ECS) includes receiving, by a component of the ECS, the pressurized air from a pressurized air source, wherein the pressurized air includes hydrocarbons or ozone, and wherein the component includes a hydrocarbon and ozone catalyst comprising one or more catalytic layers overlying one or more surfaces of the component, wherein the one or more catalytic layers comprise: a non-catalytic component comprising titanium oxide; an ozone catalytic component comprising cobalt oxide; and a hydrocarbon catalytic component comprising platinum, wherein an outermost layer of the one or more catalytic layers includes the hydrocarbon catalytic component distributed in the non-catalytic component; converting, by the hydrocarbon and ozone catalyst, at least a portion of the ozone to oxygen and at least a portion of the hydrocarbons to carbon dioxide and water.

Example 20: The method of example 19, wherein the pressurized air comprises bleed air from one or more engines.

Various examples have been described. These and other examples are within the scope of the following claims.

What is claimed is:

1. A composition, comprising:
a hydrocarbon and ozone catalyst comprising one or more catalytic layers overlying a substrate, wherein the one or more catalytic layers comprise:
   a non-catalytic component comprising titanium oxide;
   an ozone catalytic component comprising cobalt oxide; and
   a hydrocarbon catalytic component comprising platinum,
   wherein an outermost layer of the one or more catalytic layers includes the hydrocarbon catalytic component distributed in the non-catalytic component,
wherein the non-catalytic component, the zone catalytic component, and the hydrocarbon catalytic compoent are each formed from a washcoat and present in the one or more catalytic layers as particles adhered together,
wherein the hydrocarbon catalytic component hydrocarbon catalytic particles having an average particle size less than about 15 nanometers,
wherein the non-catalytic component comprises non-catalytic particles having an average particle size between about 15 nanometers and about 30 nanometers, and
wherein the ozne catalytic component comprises ozone catalytic particles having an average particle size less than about 15 micrometers.

2. The composition of claim 1, wherein the hydrocarbon catalytic component comprises:
a first portion that comprises metallic platinum at a concentration of the hydrocarbon catalytic component from about 50 weight percentage (wt. %) to less than 100 wt. %; and
a second portion that comprises non-metallic platinum at a concentration of the hydrocarbon catalytic component greater than 0 wt. % and less than about 50 wt. %, and
wherein the non-metallic platinum has an oxidation state of +2 or +4.

3. The composition of claim 1, wherein a weight ratio of the ozone catalytic component to the non-catalytic component is from about 1:0.6 to about 1:2.

4. The composition of claim 1, wherein a weight ratio of the hydrocarbon catalytic component to the ozone catalytic component is from about 1:5 to about 1:100.

5. The composition of claim 1, wherein the one or more catalytic layers comprise:
a hydrocarbon catalytic layer comprising:
   the non-catalytic component as a binder; and
   the hydrocarbon catalytic component distributed in the non-catalytic component; and
an ozone catalytic layer comprising the ozone catalytic component.

6. The composition of claim 5, wherein the ozone catalytic layer further comprises a silicone resin as a binder.

7. The composition of claim 5, wherein the ozone catalytic layer does not substantially include titanium oxide.

8. The composition of claim 1, wherein the one or more catalytic layers comprise a hydrocarbon and ozone catalytic layer comprising:
the non-catalytic component as a binder; and
the hydrocarbon catalytic component and the ozone catalytic component distributed in the non-catalytic component.

9. The composition of claim 8, wherein the one or more catalytic layers do not substantially include silicone resin as a binder.

10. An apparatus, comprising:
a substrate; and
one or more catalytic layers overlying the substrate, wherein the one or more catalytic layers comprise:
   a non-catalytic component comprising titanium oxide;
   an ozone catalytic component comprising cobalt oxide; and
   a hydrocarbon catalytic component comprising platinum,
   wherein an outermost layer of the one or more catalytic layers includes the hydrocarbon catalytic component distributed in the non-catalytic component,
   wherein the non-catalytic component, the ozone catalytic component, and the hydrocarbon catalytic component are each formed from a washcoat and present in the one or more catalytic layers as particles adhered together,
   wherein the hydrocarbon catalytic component comprises hydrocarbon catalytic particles having an average particle size less than 15 nanometers,
   wherein the non-catalytic component comprises non-catalytic particles having an average particle size between about 15 nanometers and about 30 nanometers, and
   wherein the ozone catalytic component comprises ozone catalytic particles having an average particle size less than about 15 micrometers.

11. The apparatus of claim 10, wherein the substrate comprises at least one of a ceramic, aluminum, steel, and nickel alloy.

12. The apparatus of claim 10,
wherein the substrate comprises a surface layer, and
wherein the one or more catalytic layers are overlying the surface layer.

13. The apparatus of claim 12, wherein the surface layer comprises at least one of an ozone catalyst and a hydrocarbon catalyst.

14. The apparatus of claim 10, wherein the substrate comprises a component of an environmental control system.

15. The apparatus of claim 14, wherein the component comprises at least one of a catalytic converter, an ozone converter, and a heat exchanger.

16. A method of removing contaminants from pressurized air for an environmental control system (ECS), comprising:
receiving, by a component of the ECS, the pressurized air from a pressurized air source, wherein the pressurized air includes hydrocarbons or ozone, and wherein the component includes a hydrocarbon and ozone catalyst comprising one or more catalytic layers overlying one or more surfaces of the component, wherein the one or more catalytic layers comprise:
   a non-catalytic component comprising titanium oxide;
   an ozone catalytic component comprising cobalt oxide; and
   a hydrocarbon catalytic component comprising platinum, wherein an outermost layer of the one or more catalytic layers includes the hydrocarbon catalytic component distributed in the non-catalytic component, wherein the non-catalytic component, the ozone catalytic component, and the hydrocarbon catalytic component are each formed from a washcoat and present in the one or more catalytic layers as particles adhered together, wherein the hydrocarbond catalytic component comprises hydrocarbon catalytic particles having an average particle size less than about 15 nanometers, wherein the non-catalytic component comprises non-catalytic particles having an average particle size between about 15 nanometers and about 30 nanometers, and wherein the ozone catalytic component comprises ozone catalytic particles having an average particle size less than about 15 micrometers; and converting, by the hydrocarbon and ozone catalyst, at least a portion of the ozone to oxygen and at least a portion of the hydrocarbons to carbon dioxide and water.

17. The method of claim 16, wherein the pressurized air comprises bleed air from one or more engines.

\* \* \* \* \*